(12) United States Patent
Mulder

(10) Patent No.: US 7,308,786 B2
(45) Date of Patent: Dec. 18, 2007

(54) ROD FOR ROTATING ROD-BANDS

(75) Inventor: Jan Harm Mulder, Dalen (NL)

(73) Assignee: Artemis Kautschuk - und Kunststoff-Technik GmbH (DE)

( * ) Notice: Subject to any disclaimer, the term of this patent is extended or adjusted under 35 U.S.C. 154(b) by 0 days.

(21) Appl. No.: 10/793,434

(22) Filed: Feb. 27, 2004

(65) Prior Publication Data

US 2005/0109000 A1    May 26, 2005

(30) Foreign Application Priority Data

Feb. 27, 2003   (DE) ............................... 103 08 823

(51) Int. Cl.
*A01D 61/00* (2006.01)
(52) U.S. Cl. .................. 56/16.4 R; 198/848
(58) Field of Classification Search ............... 460/114, 460/144; 198/844.1, 848, 853, 844.2, 850, 198/699
See application file for complete search history.

(56) References Cited

U.S. PATENT DOCUMENTS

| | | | | |
|---|---|---|---|---|
| 4,023,671 A | * | 5/1977 | Kramer | ...................... 198/728 |
| 4,108,298 A | * | 8/1978 | Klinkicht | .................... 198/834 |
| 4,388,990 A | * | 6/1983 | Michalik | ............... 198/867.15 |
| 4,653,632 A | * | 3/1987 | Timmer et al. | ........ 198/867.14 |
| 4,724,909 A | * | 2/1988 | Link | ........................... 171/126 |
| 4,815,587 A | * | 3/1989 | Musil | .......................... 198/728 |
| 4,892,509 A | * | 1/1990 | Jager et al. | ................. 474/237 |
| 5,099,548 A | * | 3/1992 | Loosli | ............................ 24/38 |
| 5,692,598 A | * | 12/1997 | Rohrs | .......................... 198/848 |
| 5,738,223 A | * | 4/1998 | Rohrs | .......................... 209/307 |

FOREIGN PATENT DOCUMENTS

| | | | |
|---|---|---|---|
| DE | 20011436 U1 | * | 10/2000 |
| DE | 200 11 436 | | 11/2000 |

* cited by examiner

*Primary Examiner*—Árpád Fábián Kovács
(74) *Attorney, Agent, or Firm*—Robert W. Becker; Robert W. Becker & Associates

(57) ABSTRACT

A rod for rotating rod-bands for agricultural machines, and a method of making the same, are provided. The rod comprises a rod body and metallic securement pieces serving for placement on flexible, pull-resistant belts. The securement piece has a first, flat length section secured to one of the belts by rivets or the like, and a second length section with a sleeve-like configuration for accommodating the rod body.

8 Claims, 2 Drawing Sheets

ROD FOR ROTATING ROD-BANDS

BACKGROUND OF THE INVENTION

The present invention relates to a rod for rotating bands of rods (rod-bands) for agricultural machines (harvesting machines), especially for screening rod-bands. The present invention also relates to a method for producing such a rod.

Rod-bands are used, for example, to convey farm produce, such as potatoes, whereby the produce is transported such that it is resting on the rods, and whereby dirt, rocks and the like can fall through between the rods, so that already during the transport a sorting and crude or initial cleaning of the material being transported takes place. Conventionally, a rod-band comprises two spaced-apart, endless, flexible, pull resistant belts that are made of rubber reinforced by load carriers, and that can rotate upon suitable driving, support and guide rollers and that are interconnected by rods that are parallel to one another.

Pursuant to the conventional construction, the rods of a rod-band can be made entirely of steel. However, such a rod-band is very heavy. By substituting light composite materials for steel the weight of a rod-band can be significantly reduced. With such rods, the rod body comprises a straight rod made of a solid yet lightweight material, such as glass fiber reinforced polymeric material, that is secured to the belts with the aid of metal sleeves that are disposed at the ends of the rods, whereby the ends of each rod are inserted well into the sleeves, where it is held by crimping, while the overhanging ends of the sleeves are pressed flat and are provided with holes for the securement to the belts via rivets or the like. Unfortunately, in operation such rod-belts have exhibited a number of drawbacks. For example, there exists the danger that a sleeve can twist or deform, especially in the region that is pressed flat or in the overlapping region between the pressed-flat portion and the sleeve-like portion that receives the rod body. The connection between the sleeve and the rod body can become loose. The thickness of the sleeves is too low for a countersinking of the rivet heads, so that on that side of the sleeve that faces away from the belt it is not possible to provide a smooth surface. The rods can be connected with the belts only at their ends; the securement of further belts between the edge belts is not possible. In some applications, bent securement elements are desirable for the rods so that a rod could be disposed in a plane that lies above or below the plane determined by the belts. However, such a bent configuration is not possible with a rod of glass fiber reinforced polymeric material that is held at its ends with sleeves.

These drawbacks can be avoided only partially with a known rod of the aforementioned type where the first, flat length portion of the securement pieces is a solid part produced from a solid rod by forging (see DE 200 11 436 U1). With this known rod, the rod body is accommodated by the second, sleeve-like length portion. The second length portion can be formed by a separately produced sleeve that is fixedly connected with the first length portion by clamping or welding. However, it can also be formed by a blind hole in a solid rod, and can monolithically merge into the first length portion. In all cases the manufacture of the securement pieces involves considerable expense.

It is therefore an object of the present invention to provide a rod of the aforementioned general type where the connection between the rod bodies and the belts can be produced not only so as to withstand stress but also with low expense, and whereby such a connection can be disposed not only at the ends of the rods but also in the middle of a rod.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
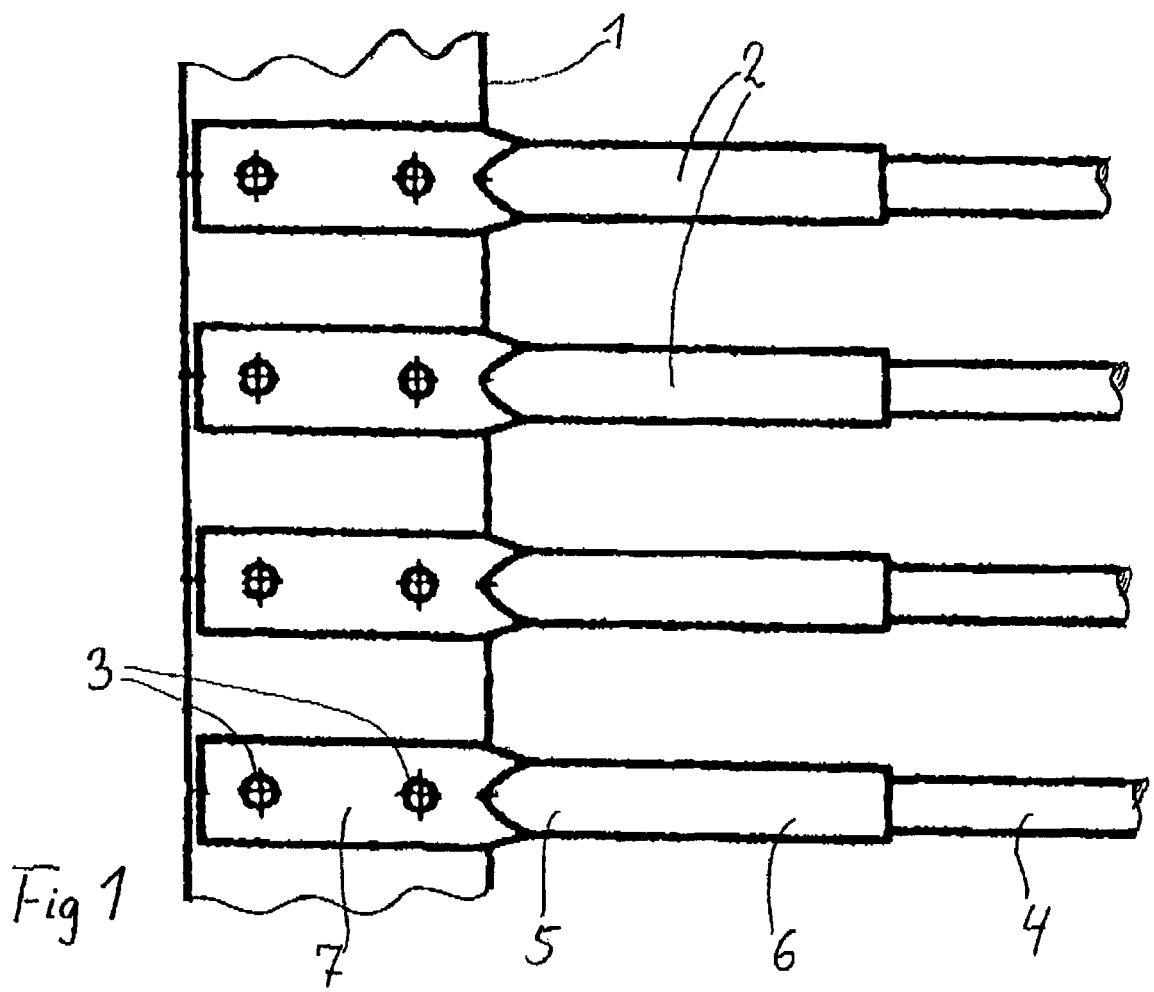
FIG. 1 is a plan view of a portion of a rod-like band having four rods of the present application.
Figure 2:
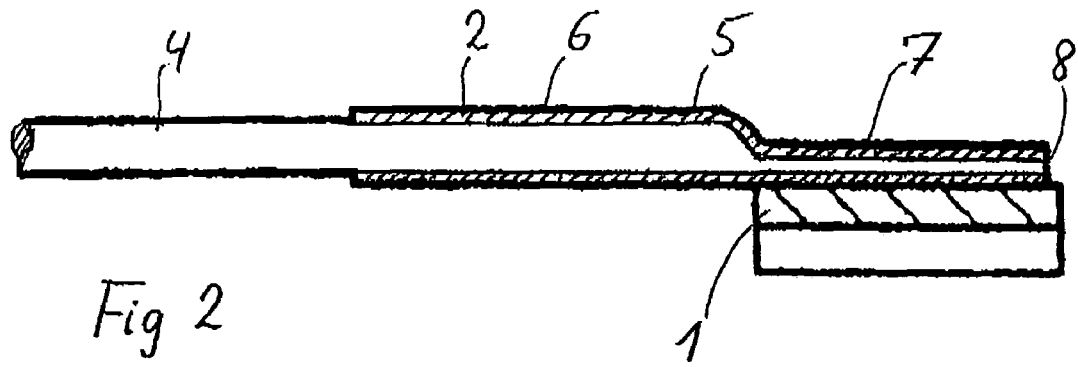
FIG. 2 is a longitudinal cross-sectional view of a portion of one exemplary embodiment of the present application.

The rod of the present application is comprised of a rod body and metallic securement pieces that serve for placement on flexible, pull-resistant belts, whereby a securement piece is provided with a first, flattened length portion that is secured to one of the belts by rivets or the like, and whereby a second length portion of the securement piece has a sleeve-like configuration for receiving the rod body; the flattened length portion of the securement piece has a sleeve-like configuration and accommodates a part of the rod body.

Such a rod is light in weight and is resistant to bending, and avoids the aforementioned drawbacks of heretofore known rods. The rods of the present application can be produced in a straightforward manner by placing sleeves on the rod body and pressing at least portions thereof flat. The rod body and the sleeve are thereby fixedly interconnected and mutually support one another. With a rod body of glass fiber reinforced polymeric material, in the pressed-together region merely the matrix of a composite material is broken up. The effect of the fibers, which provides stability, remains largely intact. The securement pieces can, in this manner, be mounted on the rod body at any desired location. The deformation of the sleeves is preferably effected in a die. In this way, the securement pieces can have precisely determined shapes imparted to them; bent or angled securement pieces can also be produced. In the starting state the sleeves preferably have an inner diameter that is somewhat greater than the outer diameter of the rod body.

At the ends of the rods the sleeve-like securement pieces are preferably flush with the rod body. The ends of the rod are particularly resistant to wear. The entire length of a securement piece can be pressed flat, so that the flat-pressed and sleeve-like portions of the securement piece coincide with one another. However, a sleeve-like not flat-pressed length section preferably adjoins the flat-pressed length section. This not flat-pressed portion of the securement piece is advantageous since it supports the rod body in the transition region between the deformed and non-deformed portions. In addition, it can serve further purposes. For example, it can have a bent or angled configuration, or it can serve for the engagement of the teeth of a spur gear that drives the rod-belt, whereby the rod is protected by the sleeve.

The rod body can be coated with a wear-resistant layer, such as a thermoplastic PVC coating. This layer is then surrounded by the securement pieces. A protective hose, which can be made, for example, of rubber, and which is placed upon the rod body, can be disposed between the securement pieces.

DESCRIPTION OF SPECIFIC EMBODIMENTS

To the extent that what is involved is a rod body made of glass fiber reinforced polymeric material, it is to be understood that rod bodies of carbon or other fibers in thermoplastic or duroplastic polymeric materials could also be utilized.

Further specific features of the present application will be described in detail subsequently.

Referring now to the drawings in detail, FIG. 1 shows a band with rods (a rod-band) that can be used, for example, with a harvesting machine for potatoes. The rod-band comprises two endless, flexible, pull resistant belts 1 that are disposed at the sides of the band; only one such belt 1 is illustrated in FIG. 1. The belts 1 comprise rubber that is reinforced with cord-like load-carriers, such as steel cord. The belts are interconnected by parallel rods 2 that are disposed at a uniform spacing relative to one another. The rods 2 are secured to the belts 1 by securement elements 3, especially rivets, that extend not only through the ends of the rod 2 but also through the belts 1. The securement of the rods 2 with the belts 1 can also be effected, for example, by screws, thus making it easier to exchange or replace the rods 2.

Each rod 2 comprises a rod body 4 of glass fiber reinforced polymeric material, on the end of which is disposed a securement piece 5. A similar securement piece is disposed at the non-illustrated opposite end of the rod 2. The securement piece 5 is made of metal, for example steel, in particular stainless steel or aluminum. The securement piece 5 has two different length portions 6 and 7, whereby the cross-section of the length portion 6 is approximately circular, while the length portion 7 that is secured to the belt 1 is flat. The important thing is that not only the round portion 6, but also the flat portion 7, of the securement piece 5 surround a portion of the rod body 4. As indicated by the reference numeral 8, the rod body 4 is flush with the securement piece 5.

During the manufacture of the rod 2, a sleeve, which forms the securement piece 5, is placed upon the rod body 4 and along one length portion, together with the material of the rod body 4 that it surrounds, is permanently deformed in a die to form the flat securement portion 7.

As can be seen from FIG. 1, the sleeve-like portions 6 are disposed in a row on the rod-band. Since the rods 2 are particularly well protected by the sleeve-like portions 6, there is the possibility of arranging a spur gear having an axis of rotation parallel to the rods 2 in such a way that the teeth engage between the rods 2, and its tooth flanks act upon the sleeve-like portions 6 (not illustrated). In this way, the rod-band can be driven.

Figure 3:
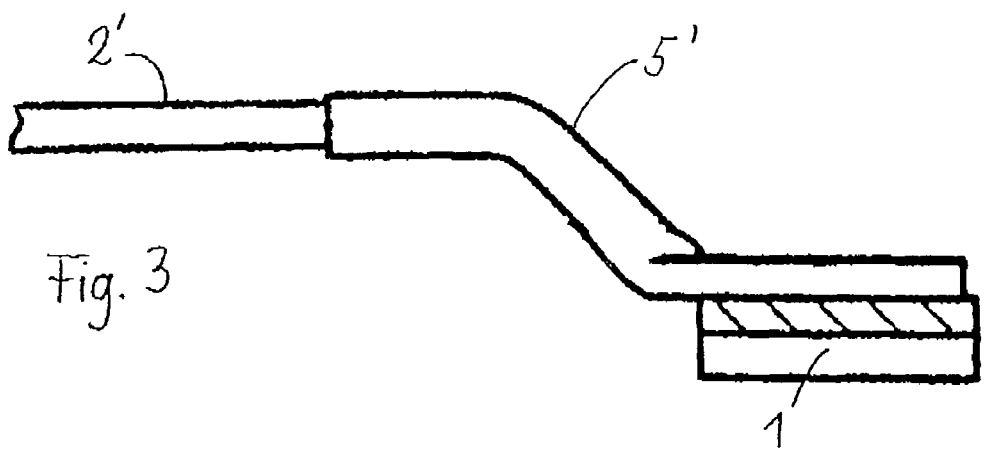
FIG. 3 is a side view of an exemplary embodiment of a rod of the present application that is modified from the embodiment shown in FIG. 2.

FIG. 3 shows a rod 2' having a bent or angled securement piece 5' by means of which the rod 2' can be disposed above or below the plane determined by the belts 1. Rods provided with such bent securement pieces can alternate with flat rods that are provided with securement pieces 5 that are not bent, are disposed on a rod-band, and serve as pick-up elements for the material that is to be conveyed or transported. Due to the present invention, a bent configuration of the securement pieces 5' can be produced in a simple manner. The flat-pressing of the ends of the securement pieces 5 can be effected in a die that also prescribes the bent shape.

The embodiment of FIG. 3 illustrates a bending of the securement piece 5' perpendicular to the plane between the belts 1. Although not illustrated, the bending or angling could also have any other desired angle.

Figure 4:
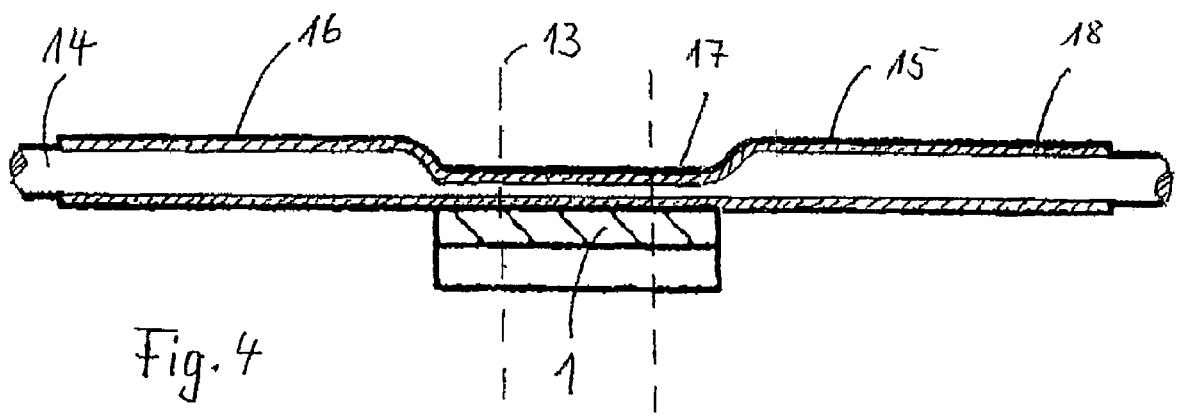
FIG. 4 shows a further exemplary embodiment of a rod of the present application.

With very wide rod-bands it may be necessary to dispose yet another, or even a plurality of, additional belts 1 between the belts 1 that are disposed at the edges. Due to the present invention, a reliable and easy to establish securement of such additional belts is also possible in the middle of the rods, as illustrated in FIG. 4. For this purpose, a metallic sleeve is placed upon the rod at the appropriate location and is pressed flat in the middle. There results a securement piece 15 that has a flat portion 17 that is suitable for securement to the belt 1 via rivets 13 or the like, and that merges into sleeve-like portions 16 and 18, the cross-section of which is not flat and which support the rod body 14. The portions 16 and 18 could, for example, also have a bent or angled shape, on one or both sides, as illustrated in FIG. 3 but not shown here.

The specification incorporates by reference the disclosure of German priority document 103 08 823.7 filed Feb. 27, 2003.

The present invention is, of course, in no way restricted to the specific disclosure of the specification and drawings, but also encompasses any modifications within the scope of the appended claims.

I claim:

1. A rod for rotating rod-bands for agricultural machines, wherein the rod interconnects flexible, pull-resistant belts, said rod comprising:
   a rod body; and
   metallic securement pieces that serve for placement on the belts, wherein each securement piece has a flat length portion that is secured to one of the belts via at least one securement element, wherein said flat length portion has a sleeve-like configuration and accommodates at least a part of said rod body, and wherein part of said flat length portion is interposed between said rod body and the belt.

2. A rod according to claim 1, wherein each securement piece has a further length portion with a sleeve-like configuration for accommodating a further part of said rod body.

3. A rod according to claim 1, wherein said rod body comprises a fiber reinforced polymeric material.

4. A rod according to claim 3, wherein said fiber reinforced polymeric material is a glass fiber reinforced polymeric material.

5. A rod according to claim 1, wherein each end of said rod body is provided with a respective one of said securement pieces.

6. A rod according to claim 1, wherein one or more of said securement pieces are disposed between ends of said rod body.

7. A rod according to claim 6, wherein one of said securement pieces disposed between ends of said rod body is provided in a middle portion thereof with a flat length portion that serves for securement to a belt, and wherein said flat length portion is disposed between two non-flat, sleeve-like length portions.

8. A rod according to claim 1, wherein at least one of said securement pieces is bent in such a way that a first and a second length portion thereof are disposed in planes that extend parallel to one another.

* * * * *